Feb. 1, 1955 A. M. HOWALD ET AL 2,701,054
PLASTIC MOLDING COMPOUND PACKAGE AND METHOD
Filed April 26, 1952
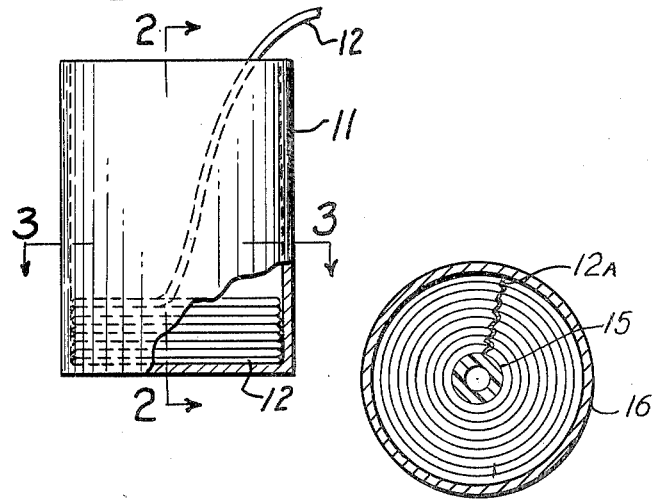
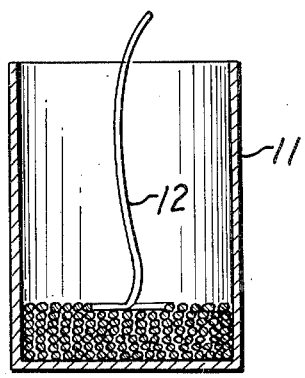
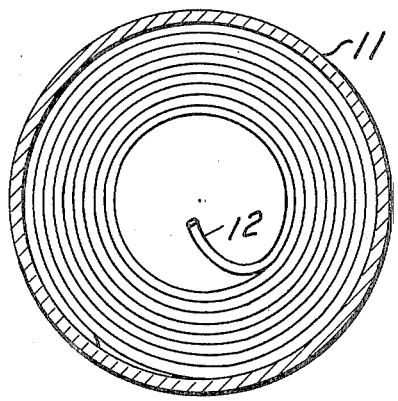
INVENTOR.S
Arthur M. Howald
BY George B. Rheinfrank
Owen & Owen
ATTORNEYS

United States Patent Office 2,701,054
Patented Feb. 1, 1955

2,701,054

PLASTIC MOLDING COMPOUND PACKAGE AND METHOD

Arthur M. Howald and George B. Rheinfrank, Perrysburg, Ohio, assignors to Glaskyd Incorporated, a corporation of Ohio Application April 26, 1952, Serial No. 284,619

4 Claims. (Cl. 206—52)

This invention relates to a plastic molding compound package and method.

Plastic molding compounds are commercially available, and new materials within this classification are in the development stage. The term "plastic," as applied to molding compounds herein and in the appended claims, is used in its usual sense, namely, to refer to non-elastic materials which, when deformed, tend to retain their deformed shape. Such materials have also been called "putty" type molding compounds, and can be produced, for example, by the procedure disclosed in U. S. Patent No. 2,549,732. Plastic molding compounds have found some use in the trade, particularly in the specialty field, for such items as special capacitors where a two-section casing is unsatisfactory. Many difficulties are encountered in the handling of such materials because of their plastic condition; for example packaging offers many difficulties, and batching by ordinary methods, such as pilling, preparatory to molding, is virtually impossible. Such molding compounds are currently marketed packaged in drums. Before being placed in the drums, the material is sheeted in relatively thin sheets, and the requisite number of sheets is then placed in the drum to provide the prescribed net weight. However, in the drum, the several sheets tend to coalesce to form a more or less solid mass, and this mass tends to sag to the bottom of the drum and to conform closely to the interior contour thereof. At the time material is removed from the drum for ultimate use, it is found that the removal of separate sheets is difficult, if not impossible, because of the coalescence, and that removal of the entire mass is virtually impossible because of its close correspondence with the interior contour of the drum. Molders have resorted to the procedure of completely destroying the drum, and pulling the same away from the more or less coherent mass of plastic molding compound inside. Even after removal of such plastic molding compound from the shipping containers as described, the material, when so packaged, is not suitable for batching according to ordinary techniques. Accordingly, relatively difficult and expensive extrusion methods have been used for batching purposes. Efforts have been made to improve molding compounds of this type by endeavoring to avoid the described plasticity characteristics and to make a more nearly conventional powdered or granular material. Such powdered or granular materials are now available commercially, but even they are too sticky to be batched by ordinary methods.

The present invention is based upon the discovery of an improved form of package for such plastic materials, and of an improved packaging method, whereby the aforementioned difficulties are overcome.

It is, therefore, an object of the present invention to provide an improved plastic molding compound package, and packaging method.

Further objects and advantages are apparent from the description which follows, and from the accompanying drawings, in which:

Fig. 1 is a partially broken away view in elevation of a shipping container filled with a plastic molding compound constituting an improved package of the invention.

Fig. 2 is a cross-sectional view along the line 2—2 of Fig. 1 further showing the disposition of the plastic molding compound in the shipping container;

Fig. 3 is a view in section along the line 3—3 of Fig. 1; and

Fig. 4 is a cross-sectional view showing a preferred molding compound package of the invention.

According to the invention a plastic molding compound package is provided. The package comprises molding compound formed in elongate sections and laid layer on layer and in side-by-side contact. A preferred plastic molding compound package of the invention is composed of a plastic polyester molding compound, for example, one filled with amphibole asbestos and Georgia clay as disclosed in U. S. Patent 2,549,732, or a similar polyester resin base filled with glass fibers, preferably together with non-fibrous, non-abrasive, inorganic fillers.

All known plastic molding compounds are made by blending relatively viscous, liquid, polymerizable, synthetic resins, e. g., polyester resins, with various fillers, usually with a mixture of fibrous fillers and non-abrasive, inorganic fillers. Preferred fibrous fillers are the asbestos materials disclosed in U. S. Patent 2,549,732, and glass fibers. Preferred non-abrasive fillers are $CaCO_3$ and kaolin, usually ground to 100 mesh, U. S. Sieve Series, or finer. It has been found that a small addition to such a resin of any given filler composition results in a suspension in the resin of filler. Increasing the ratio of filler to resin produces a sticky plastic mass, and, ultimately, a fragile, loosely bound mass which is not plastic, because it ruptures when subjected to slight pressure, but does not show plastic deformation. It has been found to be a characteristic of viscous, liquid, polymerizable, synthetic resins that, for every filler composition, there is a definite ratio of filler to resin at which the fragile, non-plastic mass is produced. This ratio is called, herein, and in the appended claims, the "minimum non-plastic, filler-to-resin ratio." For all practical purposes, the minimum non-plastic, filler-to-resin ratio is substantially identical with the maximum plastic, filler-to-resin ratio, which term is used herein, and in the appended claims, to mean the maximum ratio of filler to resin that results in a plastic mass. To produce a plastic molding compound package of the invention it is essential that the ratio of filler to resin be appreciably less, e. g., 1 per cent less, than the minimum non-plastic, or maximum plastic filler-to-resin ratio, but not more than 10 per cent less, preferably from 3 per cent to 7 per cent less. If this ratio is more than 10 per cent less than said minimum, non-plastic or maximum plastic ratio the elongate sections coalesce in the package, and lose their integrity. If the ratio is less than 1 per cent below said minimum or maximum the elongate sections are too fragile to be useful.

Referring now more particularly to the drawings, Fig. 1 shows a preferred plastic molding compound package of the invention comprising an elongate section 12 of a plastic molding compound laid layer on layer and in side-by-side contact, and positioned in a shipping container 11, which may be of any conventional material, such as metal or reinforced paper fiber. Reference to Fig. 2 demonstrates that the various layers of the plastic molding compound are in side-by-side contact, as well as layer upon layer and that the entire mass is protected at its periphery by the non-plastic container or cover 11.

Referring now to Fig. 3, it will be apparent therefrom that extruded elongate sections have been laid generally in a spiral, and in side-by-side contact in each layer.

The preferred molding compound package of the invention shown in Fig. 4 comprises an elongate section 12A of a plastic molding compound wound, generally in a spiral, layer on layer and in side-by-side contact, on a generally cylindrical hollow core 15, and positioned in a container 16. When it is desired to use the plastic molding compound from such a package, the hollow core 15 can be placed on any suitable axis, and the compound unwound as thread from a spool.

It will be apparent from the foregoing description that the invention is not limited to any particular positioning of the elongate sections. The drawings show disposition generally in a spiral, which is preferred because such packages are readily produced, and contain approximately the maximum amount of molding compound in a given size container. However, each layer could equally well be made up of a plurality of relatively short lengths of elongate extruded sections, or a single elongate section could be wound around the interior surface of a container, followed by a second elongate section around the interior surface of the first section, and so forth, until the container was essentially filled with plastic molding compound. The various layers can be made up of separate elongate lengths, or the entire package can be a single length.

It is usually preferred that the cross section of the extruded elongate sections be generally circular, although satisfactory results can be achieved if this section is polygonal. The circular cross section is usually preferred because it minimizes the areas in side-by-side contact and the areas in contact between layers.

Elongate sections of a plastic molding compound for packaging according to the invention can be produced in any convenient way. For example, extrusion of the material through an orifice of the desired shape is practical, and usually preferred, because simple and inexpensive machinery is satisfactory for such extrusion.

In view of the described adherence between separate sheets of a plastic molding compound placed in a drum to form a more or less coherent mass conforming closely to the interior shape of the container, it is entirely unexpected that a plastic molding compound can be produced and packaged in the form of extruded elongate sections laid, layer on layer and in side-by-side contact, as described and claimed herein. This is true notwithstanding that calking compound has been packaged in a somewhat similar manner. In fact, such sections can be uncoiled about as easily as can rope. Batching of the plastic molding compound in elongate form can be accomplished readily simply by cutting sections containing about the desired weight of material. This can be done automatically by multiple blade cutters when the elongate sections are of substantially uniform cross-section, which is preferred for this reason.

It will be apparent that the invention is not limited to the specific embodiments illustrated and described, as various changes can be made without departing from the spirit of the claims.

Having described the invention we claim:

1. A package consisting of a plastic molding compound containing a polyester resin and filler wherein the ratio of filler to resin is from 3 per cent to 7 per cent less than a certain filler to resin ratio, which certain ratio is a maximum at which the molding compound can subsist in an integral section, said molding compound being in the form of an elongated rope-like section and laid, generally in a spiral, layer on layer and in side-by-side contact, and a non-plastic cover for the outer layer.

2. A package consisting of a plastic molding compound containing a polyester resin and filler wherein the ratio of filler to resin is from 1 per cent to 10 per cent less than a certain filler to resin ratio, which certain ratio is a maximum at which the molding compound can subsist in an integral section, said molding compound being in the form of an elongated rope-like section and laid, generally in a spiral, layer on layer and in side-by-side contact, and a non-plastic cover for the outer layer.

3. A package consisting of a plastic molding compound containing a resin and filler wherein the ratio of filler to resin is from 1 per cent to 10 per cent less than a certain filler to resin ratio, which certain ratio is a maximum at which the molding compound can subsist in an integral section, said molding compound being in the form of at least one elongated rope-like section and laid, layer on layer, and in side-by-side contact, and a non-plastic cover for the outer layer.

4. A package as claimed in claim 3 and a spool carrying the innermost layer of molding compound.

References Cited in the file of this patent
UNITED STATES PATENTS

| | | |
|---|---|---|
| 1,493,381 | Phelps | May 6, 1924 |
| 1,923,456 | Price | Aug. 22, 1933 |
| 2,385,612 | Coutlee | Sept. 25, 1945 |
| 2,454,821 | McKee | Nov. 30, 1948 |
| 2,552,594 | Scott, Jr. | May 15, 1951 |